United States Patent
Elsen

(10) Patent No.: US 8,637,424 B2
(45) Date of Patent: Jan. 28, 2014

(54) INTEGRATED INTERSTITIAL METAL HYDRIDE CATALYST SUPPORT SYSTEMS AND ASSOCIATED PROCESSES

(75) Inventor: Heather A. Elsen, Bethlehem, PA (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 364 days.

(21) Appl. No.: 12/942,484

(22) Filed: Nov. 9, 2010

(65) Prior Publication Data

US 2012/0111768 A1    May 10, 2012

(51) Int. Cl.
| | |
|---|---|
| B01J 20/28 | (2006.01) |
| B01J 35/00 | (2006.01) |
| B01J 37/34 | (2006.01) |
| B01J 21/02 | (2006.01) |
| B01J 23/00 | (2006.01) |
| B01J 23/10 | (2006.01) |
| B32B 15/04 | (2006.01) |
| B32B 9/00 | (2006.01) |
| B32B 19/00 | (2006.01) |
| C10G 47/02 | (2006.01) |
| C10G 47/04 | (2006.01) |
| C10G 35/04 | (2006.01) |
| C10G 45/00 | (2006.01) |
| C10G 25/00 | (2006.01) |
| C10G 45/04 | (2006.01) |
| C10G 45/60 | (2006.01) |
| C10G 29/04 | (2006.01) |
| C10G 45/08 | (2006.01) |
| C10G 65/04 | (2006.01) |

(52) U.S. Cl.
USPC ............... 502/204; 502/4; 502/5; 502/202; 502/300; 502/303; 502/304; 502/305; 502/325; 428/457; 428/469; 428/472; 428/689; 208/112; 208/134; 208/143; 208/213; 208/253; 208/254 H

(58) Field of Classification Search
USPC ......... 502/4, 5, 202, 204, 300, 303–305, 325; 428/457, 469, 472, 689; 208/112, 134, 208/143, 213, 253, 254 H
See application file for complete search history.

(56) References Cited

U.S. PATENT DOCUMENTS

| 2,881,131 A | 4/1959 | Kearby |
| 3,736,265 A | 5/1973 | Suggitt |

(Continued)

FOREIGN PATENT DOCUMENTS

| EP | 1708297 A1 * | 10/2006 | ............ H01M 4/24 |
| EP | 1946837 A2 * | 7/2008 | ............ B01J 23/78 |

OTHER PUBLICATIONS

"Electrochemical activation and electrocatalytic enhancement of a hydride-forming metal alloy modified with palladium, platnum, and nickel," A. Visintin et al. Electrochimica Acta 51 (2006), pp. 3658-3667.*

(Continued)

Primary Examiner — Patricia L Hailey
(74) Attorney, Agent, or Firm — Bruce M. Bordelon; Chad A. Guice

(57) ABSTRACT

Exemplary embodiments of the present invention relate to the processing of hydrocarbon-containing feedstreams in the presence of an interstitial metal hydride comprising a surface, with a metal oxide integrally synthesized and providing a coating on the surface of the interstitial metal hydride. The catalysts and processes of the present invention can improve overall hydrogenation, product conversion, as well as sulfur and nitrogen reduction in hydrocarbon feedstreams.

28 Claims, 6 Drawing Sheets

(56) References Cited

U.S. PATENT DOCUMENTS

| | | | |
|---|---|---|---|
| 3,758,614 | A | 9/1973 | Mertzweiller et al. |
| 4,025,606 | A | 5/1977 | Acres |
| 4,040,410 | A | 8/1977 | Libowitz |
| 4,120,763 | A | 10/1978 | Breda et al. |
| RE30,083 | E | 8/1979 | Reilly et al. |
| 4,279,722 | A | 7/1981 | Kirkbride |
| 4,302,436 | A | 11/1981 | Sirovich et al. |
| 4,492,769 | A * | 1/1985 | Blanchard et al. .......... 502/262 |
| 4,545,879 | A | 10/1985 | Wan et al. |
| 4,556,551 | A | 12/1985 | Wallace et al. |
| 4,560,816 | A | 12/1985 | Davis, Jr. |
| 5,286,698 | A | 2/1994 | Carberry et al. |
| 5,332,705 | A | 7/1994 | Huang et al. |
| 5,525,435 | A | 6/1996 | Pourarian |
| 5,695,530 | A | 12/1997 | Hong et al. |
| 6,017,845 | A | 1/2000 | Ovalles et al. |
| 6,040,087 | A * | 3/2000 | Kawakami ................. 429/218.1 |
| 6,165,643 | A * | 12/2000 | Doyle et al. ............... 429/218.2 |
| 6,171,479 | B1 | 1/2001 | Ovalles et al. |
| 6,403,523 | B1 | 6/2002 | Cantrell et al. |
| 6,670,490 | B1 | 12/2003 | Campos et al. |
| 6,680,042 | B1 | 1/2004 | Schulz et al. |
| 7,157,401 | B2 | 1/2007 | Purta et al. |
| 7,387,712 | B2 | 6/2008 | Purta et al. |
| 7,455,927 | B2 | 11/2008 | DiSalvo, Jr. et al. |
| 7,601,329 | B2 | 10/2009 | Vajo et al. |
| 7,700,069 | B2 | 4/2010 | Stephens |
| 2002/0013221 | A1 | 1/2002 | Thompson et al. |
| 2002/0177735 | A1 | 11/2002 | Kanamori et al. |
| 2003/0073571 | A1 | 4/2003 | Heijden et al. |
| 2004/0074759 | A1 | 4/2004 | Purta et al. |
| 2004/0074760 | A1 | 4/2004 | Portnoff et al. |
| 2004/0077485 | A1 | 4/2004 | Purta et al. |
| 2005/0202965 | A1 | 9/2005 | Cavalcanti et al. |
| 2005/0274065 | A1 | 12/2005 | Portnoff et al. |
| 2006/0096893 | A1 | 5/2006 | De Almeida et al. |
| 2007/0087933 | A1 | 4/2007 | Purta et al. |
| 2007/0202335 | A1 | 8/2007 | Kubota |
| 2008/0233020 | A1 | 9/2008 | Purta et al. |
| 2008/0262114 | A1 | 10/2008 | Reynhout |
| 2008/0302703 | A1 | 12/2008 | Purta et al. |
| 2011/0119990 | A1 * | 5/2011 | Venkataraman et al. ....... 44/307 |
| 2011/0119992 | A1 * | 5/2011 | Pourarian et al. ............... 44/307 |
| 2012/0111768 | A1 * | 5/2012 | Elsen ........................... 208/112 |

OTHER PUBLICATIONS

Nicholas E. Leadbeater, Rashid M. Khan, "Microwave-Promoted Desulfurization of Heavy and Sulfur-Containing Crude Oil," Energy & Fuels (2008), 22(3), 1836-1839 Abstract.

L. K. Heung, G. G. Wicks, "Silica embedded metal hydrides," Journal of Alloys and Compounds 293-295 (1999) pp. 446-451.

Visintin, A. et al., "Electrochemical activation and electrocatalytic enhancement of a hyride-forming metal alloy modified with palladium, platinum and nickel", Electrochimica Acta, 2006, pp. 3658-3667, vol. 51.

* cited by examiner

INTEGRATED INTERSTITIAL METAL HYDRIDE CATALYST SUPPORT SYSTEMS AND ASSOCIATED PROCESSES

FIELD OF THE INVENTION

The present invention relates to catalysts for the processing of hydrocarbon-containing feedstreams. The catalysts include an interstitial metal hydride integrated and synthesized with a metal oxide catalytic support. The processes of the present invention use the integrated metal oxide/interstitial metal hydride containing catalysts for improved overall hydrogenation, product conversion, and sulfur reduction in hydrocarbon feedstreams.

INTRODUCTION

As the demand for hydrocarbon-based fuels has risen, the need for improved processes for desulfurizing hydrocarbon feedstreams has increased, as well as the need for increasing the conversion of the heavy portions of these feedstreams into more valuable, lighter fuel products. These hydrocarbon feedstreams include, but are not limited to, whole and reduced petroleum crudes, shale oils, coal liquids, atmospheric and vacuum residua, asphaltenes, deasphalted oils, cycle oils, FCC tower bottoms, gas oils, including atmospheric and vacuum gas oils and coker gas oils, light to heavy distillates including raw virgin distillates, hydrocrackates, hydrotreated oils, dewaxed oils, slack waxes, raffinates, biofuels, and mixtures thereof.

Hydrocarbon streams boiling above 430° F. (220° C.) often contain considerable amounts of large multi-ring hydrocarbon molecules and/or conglomerated associations of large molecules containing a large portion of the sulfur, nitrogen and metals present in the hydrocarbon stream. A significant portion of the sulfur contained in these heavy oils is in the form of heteroatoms in polycyclic aromatic molecules, such as dibenzothiophenes, from which the sulfur is difficult to remove.

The high molecular weight, large multi-ring aromatic hydrocarbon molecules or associated heteroatom-containing (e.g., S, N, O) multi-ring hydrocarbon molecules in heavy oils are generally found in a solubility class of molecules termed as asphaltenes. A significant portion of the sulfur is contained within the structure of these asphaltenes or lower molecular weight polar molecules termed as "polars" or "resins". Due to the large aromatic structures of the asphaltenes, the sulfur can be refractory in nature and can be difficult to remove. In conventional refining processes, sulfur compounds are removed in refinement processes from various hydrocarbon streams by "cracking" the petroleum oils in the presence of a metal catalyst and hydrogen. These conventional refining processes for sulfur removal from hydrocarbon streams are known by such names as "hydrodesulfurization" processes or "hydrocracking" processes, and are well known in the industry.

In these processes, the sulfur atoms in the hydrocarbon streams are exposed or separated from the oil and are able to react with hydrogen which is then liberated from the process typically in the form of a hydrogen sulfide gas. In these processes, nitrogen and metals are also removed to some extent from the hydrocarbon streams (i.e., "denitrogenation" and "demetalization"). However, nitrogen and/or metals are sometimes targeted for removal by "pre-processing" the hydrocarbon streams and removing a portion of the nitrogen and/or metals (which may include some amount of reaction cracking and/or desulfurization) prior to contacting the primary hydrodesulfurization or hydrocracking catalysts. Additionally, in these hydrodesulfurization or hydrocracking processes, some of the larger hydrocarbon molecules are "cracked" into smaller hydrocarbon molecules. This is generally called "cracking" or "conversion" and is a significant part of many of these hydroprocessing processes as this converts heavier, low value petroleum streams, such as gas oils and resids, into higher value products such as transportation fuels, for example, gasolines, jet fuels, and diesels.

Alternatives to conventional hydroprocessing processes have been proposed in U.S. Pat. Nos. 7,157,401 and 7,387,712 to Purta et al. In these processes, petroleum oils are contacted with interstitial metal hydride ("iMeH") catalysts under mild conditions for hydrogenation of molecules. In particular, these patents disclose three specific compositions of iMeHs: Cat 100 (or "$AT_5$ type"), CAT 200 (or "$A_2T_{14}B$ type") and CAT 300 (or "$A_2T$ type"). It is shown in these patents that the iMeH catalysts show improved hydrogenation activities in the presence of microwaves under mild processing conditions (200° C. at 50 psig). Furthermore, these patents describe formation of composite catalysts containing blends of hydrides and preformed supports.

While the iMeH systems described above are useful as hydroprocessing catalysts, there remains a need in the art to further improve the activities of iMeH catalysts to make the processes of heavy hydrocarbon conversion and upgrading more economically attractive and feasible. In particular, catalysts with higher activities and improved long-term stabilities are desirable.

BRIEF DESCRIPTION OF THE INVENTION

Exemplary embodiments of the current invention relate to catalysts and processes for hydroprocessing a hydrocarbon-containing feedstream to produce a product stream with improved product qualities.

In one aspect, the invention features a catalyst comprising an interstitial metal hydride ("iMeH") having a surface and a metal oxide support. Specifically, in the embodiments herein, the metal oxide support is synthesized while in integral contact with the iMeH in a manner such that an interfacial compound containing elements of both the metal oxide and the iMeH is formed between these two catalytic components during the preparation. This "chemically integrated" (or "bonded") support system leads to high integration and connectivity of the support and the hydride and improves the catalytic activity of the resulting supported iMeH catalyst system.

In a preferred embodiment herein is a catalyst comprising:
a metal oxide layer; and
an interstitial metal hydride;
wherein an interfacial compound containing at least one element from each the metal oxide layer and the iMeH is formed between the metal oxide layer and the iMeH.

In a more preferred embodiment of the catalyst, the metal oxide layer forms a coating around the interstitial metal hydride. In additionally preferred embodiments herein, during preparation, the metal oxide precursor and iMeH or further doped with a metal that can have mixed valency states. Preferably, the metal oxide layer is doped with a mixed valence metal selected from vanadium, cerium, tin, antimony, and combinations thereof. In yet another preferred embodiment, catalyst further comprises at least one transition metal element selected from Mo, W, Cr, V, Mn, Sn, Fe, Co, Ni, Pd, Ru, Ir, Rh, Ag and Pt.

In a most preferred embodiment, the metal oxide is at least 10 wt % based on the total weight of the integrated metal oxide layer and iMeH.

In certain embodiments of the catalyst of the present invention, the iMeH has a compositional formula of $A_{1-x}M_x T_{5-y-z}B_yC_z$, wherein:
A=Mm (mischmetal); T=Ni; M=La, Pr, Nd or Ce; B=Co; C=Mn, Al or Cr; and
x=0.0 to 1.0; y=0.0 to 2.5; and z=0.0 to 0.5.

In other embodiments of the catalyst of the present invention, the iMeH has a compositional formula of $A_{2-x}M_x T_{14-y}C_yD_zB$, wherein:
A=Nd or Pr; T=Fe; M=La, Pr, Nd or Ce; B=Boron; C=Co; D=Cr, Ni or Mn; and
x=0.0 to 2.0; y=0.0 to 14; and z=0.0 to 3.0.

In some embodiments of the catalyst of the present invention, the iMeH has a compositional formula of $A_{2-x}M_x T_{1-y}B_y$, wherein:
A=Mg; T=Ni or Cu; M=La; B=Fe or Co; and
x=0.0 to 0.5; and y=0.0 to 0.5.

In certain embodiments of the catalyst of the present invention, the iMeH has a compositional formula of $A_{1-x}B_x T_{(2-y)\pm d1}C_{y\pm d2}$, wherein:
A=Nd or Zr; B=at least one of La, Ce, Pr, Gd, Tb, Dy, Er, Ho, Ti and Hf; T=at least one of Fe and V; C=at least one of Cr, Mn, Fe, Co, Ni and Cu; and
x=0.0 to 1.0; and y=0.0 to 2.0; and
$d_1$=0.00 to 0.2; and $d_2$=0.00 to 0.2.

In certain embodiments of the catalyst of the present invention, the metal oxide is selected from the group consisting of alumina, silica, titania, zirconia, ceria, vanadia and combinations thereof.

In certain embodiments of the catalyst of the present invention, the metal oxide is a porous metal oxide. In certain embodiments, the porous metal oxide has a pore volume of from about 0.01 to about 0.90 cc/g, and more preferably about 0.1 to about 0.9 cc/g.

In certain embodiments of the catalyst of the present invention, the catalyst has a surface area of at least 20 m²/g.

In certain embodiments of the catalyst of the present invention, the catalyst further comprises at least one transition metal element selected from Mo, W, Cr, V, Mn, Sn, Fe, Co, Ni, Pd, Ru, Ir, Rh, Ag and Pt. In certain embodiments, the catalyst further comprises Mo and at least one transition metal element selected from Co, Ni, and combinations thereof.

Also embodied herein is a method of making a catalyst as described, comprising:
a) combining an iMeH, a metal alkoxide and an alcohol;
b) adding an acid to initiate a condensation reaction to form a metal oxide-containing gel; and
c) drying the gel to form an integrated metal oxide layer and iMeH having a surface,
wherein an interfacial compound containing at least one element from each the metal oxide layer and the iMeH is formed between the metal oxide layer and the iMeH.

In a preferred embodiment, the method of making the catalyst further comprises at least one of the following steps:
d) calcining the catalyst under an inert atmosphere;
e) charging the catalyst under hydrogen.

In a preferred embodiment, the method of making the catalyst further comprises wherein step a) further comprises wherein a mixed valence metal dopant selected from vanadium, cerium, tin, antimony, and combinations thereof is added.

Also embodied herein is utilizing a process for upgrading a hydrocarbon feedstream, comprising contacting a hydrocarbon feedstream with a catalyst to yield an upgraded hydrocarbon product stream wherein the catalyst is comprised of:
a metal oxide layer;
an interstitial metal hydride; and
an interfacial compound containing at least one element from each the metal oxide layer and the iMeH wherein the interfacial compound is formed between the metal layer support and the iMeH.

In a preferred embodiment, such process is a hydroprocessing process selected from hydrogenation, hydrocracking, hydrodesulfurization, hydrodenitrogenation, hydrodemetalization, and catalytic hydrodewaxing processes. In another preferred embodiment, such process is a reforming process selected from catalytic reforming and catalytic isomerization.

The catalysts embodied herein are particularly useful if the upgrading of hydrocarbon feedstreams wherein the hydrocarbon feedstream contains at least 10 ppm nitrogen, which can typically be a poison to at least some of the catalytic components utilized.

DETAILED DESCRIPTION OF THE INVENTION

Figure 1:
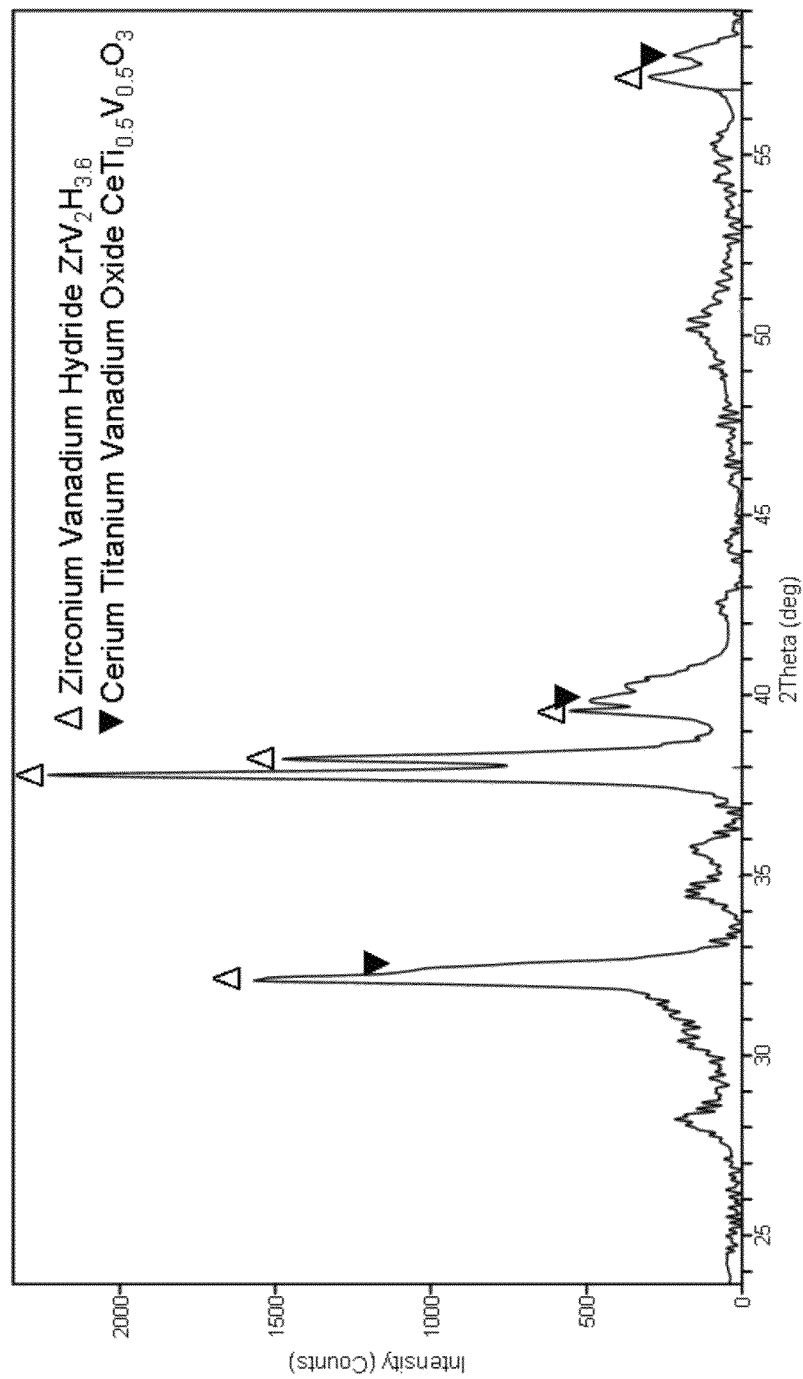
FIG. 1 is an X-Ray Diffraction ("XRD") pattern of an embodiment of an "integrally synthesized" iMeH/TiO$_2$/Ce catalyst of the present invention.

Exemplary embodiments of the current invention relate to catalysts and processes for hydroprocessing a hydrocarbon-containing feedstream to produce a product stream with improved product qualities, by using a porous metal oxide highly integrated with an interstitial metal hydride ("iMeH"). These new catalyst systems possess significant improvements in hydroprocessing of hydrocarbon feedstreams. Specifically, the high integration and connectivity between the metal oxide support and the iMeH allow more effective utilization of monatomic hydrogen, providing catalysts with improved hydrogenation activities and increased long-term stabilities.

DEFINITIONS

As used herein, "improved product qualities" include, but are not limited, to increased hydrogenation (or increased hydrogen content by weight), lower average boiling point conversion (or "cracking"), higher API gravity, reduced viscosity, and lower levels of sulfur, nitrogen, and metals.

The terms "hydrocarbon-containing stream", "hydrocarbon stream" or "hydrocarbon feedstream" as used herein are equivalent and are defined as any stream containing at least 75 wt % hydrocarbons. These hydrocarbon feedstreams may be comprised of either "petroleum-based hydrocarbons", "biofuel hydrocarbons", or combinations thereof. The "petroleum-based hydrocarbons" are hydrocarbons obtained or derived hydrocarbonaceous materials from geological formations such as, but not limited to, crude oils, and oils derived from coal, tar sands, or bitumens, as well as any intermediate hydrocarbon or final hydrocarbon product derived from these sources. These are generally considered as non-renewable hydrocarbon sources.

As used herein, the terms "heavy hydrocarbon" or "heavy hydrocarbon stream" are equivalent and are defined herein as a subset of "petroleum-based hydrocarbons" and include hydrocarbon-containing streams containing at least 75 wt % hydrocarbons and having an API gravity of less than 20. Exemplary heavy hydrocarbon streams for use in the present invention include, but are not limited to low API gravity, high sulfur, high viscosity crudes; tar sands bitumen; liquid hydrocarbons derived from tar sands bitumen, coal, or oil shale; as well as petrochemical refinery heavy intermediate fractions, such as atmospheric resids, vacuum resids, and other similar intermediate feedstreams and mixtures thereof containing boiling point materials above about 343° C. (650° F.). Heavy hydrocarbon streams may also include a blend of the hydrocarbons listed above with lighter hydrocarbon streams for control of certain properties for transport or sale, such as, but not limited to fuel oils and crude blends.

As used herein, the term "biofuel hydrocarbons" or "biofuels" are equivalent and are a subset of hydrocarbon streams, and are defined as hydrocarbon-containing streams wherein at least 50 wt % of the hydrocarbon material in the hydrocarbon-containing stream is derived from renewable biomass resources. These biomass resources include any plant or animal derived organic matter, such as dedicated energy crops and trees, agricultural food and feed crops, agricultural crop wastes and residues, wood wastes and residues, aquatic plants, algae, fungi, plant oils, animal oils, animal tissues, animal wastes, municipal wastes, and other waste materials. Biofuels may include, but are not limited to, hydrocarbons in the middle distillate range, diesels, kerosenes, gasoline, gasoline fractions, biodiesel, biojet fuel, biogasolines and combinations thereof.

As used herein, the term "plant oil" is a subset of biofuels and is defined as a hydrocarbon-containing material derived from plant sources, such as agricultural crops and forest products, as well as wastes, effluents and residues from the processing of such materials. Plant oils may include vegetable oils. Examples of plant oils may include, but are not limited to, canola oil, sunflower oil, soybean oil, rapeseed oil, mustard seed oil, palm oil, corn oil, soya oil, linseed oil, peanut oil, coconut oil, corn oil, olive oil, and combinations thereof.

As used herein, the term "animal oil" is a subset of biofuels and is defined as a hydrocarbon-containing material derived animal sources, as well as wastes, effluents and residues from the processing of such materials. Examples of animal oils may include, but are not limited to, animal fats, yellow grease, animal tallow, pork fats, pork oils, chicken fats, chicken oils, mutton fats, mutton oils, beef fats, beef oils, and combinations thereof.

As used herein, the terms "interstitial metal hydride" or "iMeH" are equivalents and are defined as materials that are composed of alloyed metals combined with atomic hydrogen, wherein the atomic hydrogen occupies interstices within the metal alloy matrix. The terms "interstitial metal hydride" or "iMeH" are intended to refer solely to the iMeH component or components of the catalysts of the invention.

The terms "high pressure/high severity" and "severe" hydroprocessing conditions and/or processes are equivalents as used herein and are defined as hydroprocessing processes wherein a hydrocarbon feedstream is contacted with a hydroprocessing catalyst in the presence of hydrogen at process conditions of at least 400 psig and at least 200° C. In such embodiments of the present invention, the iMeH may be a "high severity hydroprocessing iMeH," also referred to herein as "CAT 400 iMeH" catalysts.

The term "dopant" as used herein refers an auxiliary substance added to a primary substance or composition in order to change its physical or chemical properties. The term "dopant" often refers to an element that is introduced to establish charge transfer ability or conductivity.

The term "mixed valence metal" or as used herein refers to element, typically a metal ion, that is or can be present in more than one oxidation state. For example, mixed valence cerium may include cerium(III) and cerium(IV), and mixed valence vanadium may include vanadium(III), vanadium(IV), and vanadium(V).

The term "activity" as used herein, when referring to a catalyst of the invention, refers to the amount of a reactant consumed or the amount of a product produced per unit amount of time under a given set of reaction conditions. The activity may be measured, for example, by determining a rate constant. In a non-limiting example, the activity of a catalyst described herein may be measured by determining the first order rate constant for the disappearance of a compound in a model feed, e.g., the conversion (or disappearance) of dibenzothiophene, 4,6-diethyldibenzothiophene or 1n-dodecyl-naphthalene.

"Group VI" and "Group VIII" refer to the older IUPAC groupings of the Periodic Table. Group VI metals include the elements chromium, molybdenum and tungsten. Group VIII metals include the elements iron, cobalt, nickel, ruthenium, rhodium, palladium, osmium, iridium and platinum.

The term "hydroprocessing" (or equivalent term "hydrotreating") as used herein is a general term and is defined as any catalytic process involving hydrogen. This includes the reaction of any petroleum fraction with hydrogen in the presence of a catalyst. This includes processes which remove undesirable impurities such as sulfur, nitrogen, metals, and unsaturated compounds in the presence of hydrogen and a catalyst. Examples include, but are not limited to, hydrogenation, hydrocracking, hydrodesulfurization, hydrodenitrogenation hydrodemetalization, and catalytic hydrodewaxing.

The term "embedded", when used herein to refer to an iMeH and a metal oxide, means that a metal oxide has been synthesized around the iMeHs, such that the surface of the iMeH is completely coated with the metal oxide, and that the surface of the resulting catalyst is composed entirely of the metal oxide. When used herein to refer to additional catalytic elements and a metal oxide, the term "embedded" means that the additional elements are integral to, or highly connected and incorporated with, the metal oxide, as opposed to being present only on the surface of the metal oxide or in physical blends of preformed material (e.g., alumina particles physically mixed with iMeH particles as described in the prior art).

The terms "upgrade", "upgrading" and "upgraded", when used in conjunction with the hydroprocessing of a hydrocarbon feedstream, describes a hydrocarbon feedstream that is or has been subjected to hydroprocessing, or a resulting material or product stream, having a reduction in the molecular weight of the hydrocarbon compounds in the hydrocarbon feedstream, an increase in hydrogen content of the hydrocarbon compounds in the hydrocarbon feedstream, a reduction in the boiling point range of the hydrocarbon feedstream, and/or a reduction in the quantity of impurities such as sulfur, nitrogen, and metals. When the terms "upgrade", "upgrading" and "upgraded", when used in conjunction with the reforming of a hydrocarbon feedstream describes a hydrocarbon feedstream that is or has been subjected to reforming, or a resulting material or product stream, having either 1) a net increase in aromatic and/or cyclic hydrocarbon compounds and a net increase in molecular hydrogen, or 2) a net increase in isomers (non-linear paraffins) of hydrocarbon compounds that were present in the hydrocarbon feedstream (e.g., conversion of n-butane to iso-butane).

The term "hydrogenation" as used herein is defined as any process wherein a hydrocarbon feedstream is contacted with a catalyst and hydrogen at an elevated pressure and temperature wherein hydrogen is chemically added to at least a portion of the hydrocarbon compounds in the hydrocarbon feedstream, thereby increasing the hydrogen content of the hydrocarbon compounds. Exemplary hydrogenation applications include the hydrogen addition to "unsaturated" olefinic or aromatic hydrocarbon compounds (e.g., olefin hydrogenation or aromatic hydrogenation). Hydrogenation is a subset of hydroprocessing processes.

The term "hydrocracking" as used herein is defined as any process wherein a hydrocarbon feedstream is contacted with a catalyst and hydrogen at an elevated pressure and temperature wherein at least a portion of the hydrocarbon feedstream is converted into lower-boiling point products, thereby resulting in an overall lower average boiling point product stream based on wt %. Hydrocracking is a subset of hydroprocessing processes.

The term "hydrodesulfurization" or "HDS" as used herein is defined as a process in which a hydrocarbon feedstream is contacted with a catalyst and hydrogen at an elevated pressure and temperature wherein at least a portion the sulfur elements or compounds present in hydrocarbon feedstream are removed, thereby resulting in at least one hydrocarbon product with a lower sulfur content than the hydrocarbon feedstream. Hydrodesulfurization is a subset of hydroprocessing processes.

The term "hydrodenitrogenation" or "HDN" as used herein is defined as a process in which a hydrocarbon feedstream is contacted with a catalyst and hydrogen at an elevated pressure and temperature wherein at least a portion the nitrogen elements or compounds present in hydrocarbon feedstream are removed, thereby resulting in at least one hydrocarbon product with a lower nitrogen content than the hydrocarbon feedstream. Hydrodenitrogenation is a subset of hydroprocessing processes.

The term "hydrodemetalization" or "HDM" as used herein is defined as a process in which a hydrocarbon feedstream is contacted with a catalyst and hydrogen at an elevated pressure and temperature wherein at least a portion the metal elements or compounds present in hydrocarbon feedstream are removed, thereby resulting in at least one hydrocarbon product with a lower metal content than the hydrocarbon feedstream. Hydrodemetalization is a subset of hydroprocessing processes.

The term "catalytic hydrodewaxing" as used herein is defined as a catalytic hydrocracking process which uses molecular sieves, suitably zeolites, to selectively hydrocrack and/or isomerize waxes (i.e., long chain paraffinic molecules with greater than about 22 carbon molecules) present in the hydrocarbon streams to smaller carbon content molecules, thereby resulting in an overall lower average boiling point product stream based on wt %. Catalytic hydrodewaxing is a subset of hydroprocessing processes.

The term "reforming" as used herein is a general term and is defined as any catalytic process involving contacting a hydrocarbon feedstream and a reforming catalyst wherein the primary reaction is to reform the hydrocarbon molecules into aromatic hydrocarbons and/or molecular isomers. They are characterized by only a small net use of hydrogen or a net production of hydrogen in the catalytic process (i.e., hydrogenation of molecules is not a primary reaction). Typical catalytic reforming processes go by the general names of "catalytic reforming" or "isomerization", both processes which are considered herein as subsets of the term reforming processes as utilized herein.

It is specifically understood that any numerical value recited herein includes all values from the lower value to the upper value, i.e., all possible combinations of numerical values between the lowest value and the highest value enumerated are to be considered to be expressly stated in this application. For example, if a concentration range or a beneficial effect range is stated as 1% to 50%, it is intended that values such as 2% to 40%, 10% to 30%, or 1% to 3%, etc., are expressly enumerated in this specification. These are only examples of what is specifically intended.

Also, it is to be understood that the phraseology and terminology used herein is for the purpose of description and should not be regarded as limiting. The use of "comprising," "including," "having," and variations thereof herein is meant to encompass the items listed thereafter and equivalents thereof as well as additional items. "Comprising" encompasses the terms "consisting of" and "consisting essentially of." The use of "consisting essentially of" means that a composition or method may include additional ingredients and/or steps, but only if the additional ingredients and/or steps do not materially alter the basic and novel characteristics of the claimed composition or method.

Interstitial Metal Hydrides

The catalysts of the present invention include interstitial metal hydrides (iMeHs), which are materials that are composed of alloyed metals combined with atomic hydrogen, wherein the atomic hydrogen is stored interstitially within the metal alloy matrix.

U.S. Pat. Nos. 7,157,401 and 7,387,712 to Purta et al., which are incorporated herein by reference in their entireties, disclose hydroprocessing processes using iMeH catalysts. In these processes, hydrocarbon streams are contacted with iMeH catalysts under mild conditions (e.g., 200° C. at 50 psig), optionally in the presence of microwaves, for the hydrogenation of hydrocarbon molecules. In particular, these patents disclose three specific compositions of iMeHs: Cat 100 (or "$AT_5$" type"), CAT 200 (or "$A_2T_{14}B$ type") and CAT 300 (or "$A_2T$ type").

U.S. Patent Application No. 61/281,965, which is incorporated herein by reference in its entirety, discloses "high severity hydroprocessing iMeHs," which provide improved hydroprocessing of hydrocarbon streams at high temperatures (above 200° C.) and high pressures (above 400 psig) associated with many commercial hydroprocessing processes. The high severity hydroprocessing iMeHs have both significant hydrogen storage capacities under the processing conditions (i.e., the iMeHs are not depleted of hydrogen), as well as high hydrogen kinetics rates for the transfer of hydrogen into and out of the iMeHs under the hydroprocessing conditions (i.e., hydrogen atoms move in and out of the iMeH at a rapid rate). In particular, this application discloses specific compositions of iMeHs: Cat 400 (or "$AT_{2\pm d1 \pm d2}$ type").

The metal alloy matrix of the iMeH can have a crystalline or amorphous structure. The iMeH is especially suited to accommodating monatomic hydrogen extracted from molecular hydrogen. The hydrogen atoms occupy interstitial sites in the alloy lattice of the iMeH. The quantity of atomic hydrogen in the interstitial metallic hydrides has a measurable value, which is a function of alloy composition, and operating temperature and hydrogen partial pressure. In an iMeH, the ratio of hydrogen to metal atoms may vary over a range and may not be expressible as a ratio of small whole numbers. The iMeH components of the catalysts of the present invention are able to dissociate diatomic hydrogen molecules at the surface into monatomic hydrogen (i.e. hydrogen atoms), absorb copious amounts of monatomic hydrogen thus produced into the metal alloy, and desorb the monatomic hydrogen under the appropriate conditions. A heat of absorption is produced when the molecular hydrogen dissociates into atomic hydrogen and the hydrogen atoms position themselves interstitially in the structure of the material. Additional energy at a suitable steady state process temperature and pressure is required for the release of monatomic hydrogen from within the iMeH. This energy can be derived from the process heat of reaction or from external application of energy or both.

The iMeHs are produced by preparing samples of the constituent metals in the desired proportions, and combining them and heating them so that they melt together homogeneously to produce a metal alloy. The resulting metal alloy may then be exposed to hydrogen at a temperature and pressure characteristic of the alloy so that the metal alloy takes up the hydrogen in monatomic form.

The iMeH component materials of the present invention are typically prepared by a volumetric (gas to solid alloy) method at a known temperature and pressure using a stainless steel reactor. The metallic hydride will absorb hydrogen with an exothermic reaction. This hydrogenation process is reversible according to the following chemical reaction schematic:

Metal Alloy+$H_2 \leftrightarrows$ iMeH+Energy

As noted, the hydrogen uptake/release is accompanied by an exothermic/endothermic exchange of energy. Hydrogen uptake/release is also accompanied by volume expansion/contraction of the iMeH which under certain conditions can be high as about 20 to 25 vol %. During this process, hydrogen atoms will occupy interstitial sites in the alloy lattice. This hydrogen absorption/desorption by an iMeH can be measured and characterized in a Pressure-Composition-Temperature ("PCT") plot or graph.

The metal alloy from which an iMeH is produced can be prepared by mechanical or induction-heated alloying processes. The metal alloy can be stoichiometric or non-stoichiometric. Non-stoichiometric compounds are compounds that exhibit wide compositional variations from ideal stoichiometry. Non-stoichiometric systems contain excess elements, which can significantly influence the phase stability of the metallic hydrides. The iMeH is produced from a metal alloy by subjecting the alloy to hydrogen at a pressure and temperature that is characteristic of the particular alloy.

The iMeH catalysts of the present invention can be selected to have a desired lattice structure and thermodynamic properties, such as the applied pressure and temperature at which they can be charged and the operating pressure and temperature at which they can be discharged. These working thermodynamic parameters can be modified and fine tuned by an appropriate alloying method, and therefore, the composition of the catalysts can be designed for use in a particular catalytic process.

It should be noted that the integrated metal oxide/iMeH catalysts of the present invention can be used starting with any interstitial metal hydride and such compositions of the present invention are not limited to the specific iMeHs disclosed herein. It is believed herein that the novel catalyst integration/synthesis processes and resulting catalysts herein can be utilized in multiple catalytic processes; and the catalytic processing improvements as exemplified herein, can be achieved with any known interstitial metal hydride. Exemplary embodiments of the iMeH suitably include a "CAT 100," "CAT 200," or "CAT 300" catalyst. The compositional formulations of CAT 100, CAT 200 and CAT 300 are shown as follows.

CAT 100
$AT_5$ Type
Crystal Structure: Hexagonal $$A_{1-x}M_xT_{5-y-z}B_yC_z \quad \text{General Formula:}$$

wherein:
A=Mm (mischmetal); T=Ni; M=La, Pr, Nd or Ce; B=Co; C=Mn, Al or Cr; and
x=0.0 to 1.0; y=0.0 to 2.5; and z=0.0 to 0.5.

CAT 200
$A_2T_{14}B$ Type
Crystal Structure: Tetragonal $$A_{2-x}M_xT_{14-y}C_yD_zB \quad \text{General Formula:}$$

wherein:
A=Nd or Pr; T=Fe; M=La, Pr, Nd or Ce; B=Boron; C=Co; D=Cr, Ni or Mn; and
x=0.0 to 2.0; y=0.0 to 14; and z=0.0 to 3.0.

CAT 300
$A_2T$ Type
Crystal Structure: Monoclinic $$A_{2-x}M_xT_{1-y}B_y \quad \text{General Formula:}$$

wherein:
A=Mg; T=Ni or Cu; M=La; B=Fe or Co;
x=0.0 to 0.5; and y=0.0 to 0.5.

In certain embodiments, the iMeH is a "CAT 400" catalyst composition. The composition of the CAT 400 elements can be either stoichiometric or non-stoichiometric. The compositional formulations of CAT 400 are shown as follows. It should be noted that when $d_1=0$ and $d_2=0$, a stoichiometric composition of CAT 400 is shown.

CAT 400 (Stoichiometric & Non-Stoichiometric Compositions)
$AT_{2\pm d1 \pm d2}$ Type
Crystal Structure: Compositionally dependent; Cubic Laves phase-C15 ($MgCu_2$-type) and Hexagonal Laves phase-C14 ($MgZn_2$-type)

$$A_{1-x}B_xT_{(2-y)\pm d1}C_{y\pm d2} \quad \text{General Formula:}$$

wherein:
A=Nd or Zr; B=at least one of La, Ce, Pr, Gd, Tb, Dy, Er, Ho, Ti and Hf;

T=at least one of Fe and V; C=at least one of Cr, Mn, Fe, Co, Ni and Cu; and
x=0.0 to 1.0; and y=0.0 to 2.0; and
$d_1$=0.00 to 0.2; and $d_2$=0.00 to 0.2

In an exemplary embodiment of CAT 400, $d_1$=0; and $d_2$=0 (stoichiometric only compositions).

In an exemplary embodiment of CAT 400, $d_1$=0.05 to 0.2; and $d_2$=0.05 to 0.2 (non-stoichiometric only compositions).

In an exemplary embodiment of CAT 400, A=Zr and T=V.

In another exemplary embodiment of CAT 400, A=Zr and T=V; x=0.2 to 0.6; and y=0.2 to 0.6.

In another exemplary embodiment of CAT 400, A=Zr; B=at least one of Ti and Hf; T=V; C=at least one of Mn and Fe.

In a further exemplary embodiment of CAT 400, A=Nd or Zr; B=at least one of La, Ce, Pr, Gd, Tb, Dy, Er, Ho, Ti and Hf; T=at least one of Fe and V; C=at least one of Cr, Mn, Fe, Co, Ni and Cu; x=0.2 to 0.6; and y=0.2 to 0.6.

In a highly suitable embodiment of CAT 400, A=Zr; B=at least one of Ti and Hf; T=V; C=at least one of Mn and Fe; x=0.2 to 0.6; and y=0.2 to 0.6.

In another highly suitable embodiment of CAT 400, A=Zr; B=at least one of Ti and Hf; T=V; C=at least one of Mn and Fe; x=0.2 to 0.6; and y=0.

The CAT 400 iMeHs have high hydrogen storage capacities and high hydrogen kinetics rates at the high temperatures and pressures at which most commercial hydroprocessing processes operate. In particular, these high severity processes include, but are not limited to, hydrogenation, hydrocracking, hydrodesulfurization, hydrodenitrogenation, and hydrodemetalization processes.

Metal Oxides

The catalysts of the present invention include a compositionally integrated metal/iMeH catalyst or catalyst component. In the catalyst embodiments herein, the iMeH is not physically blended with a preformed support as in the prior art, but rather the metal oxide support is synthesized per the processes described herein while in the presence of the iMeH thereby resulting in a compositionally integrated metal oxide/iMeH. In the catalysts embodied herein, the process results in integrated metal/iMeH catalyst (or catalyst component if additional catalyst components are added during or after such synthesis), wherein an interfacial compound containing elements of both the metal oxide and the iMeH is formed between the metal oxide support system and the iMeH during the preparation. This "chemically integrated" (or "bonded") support system leads to high integration and/or connectivity of the support and the hydride and is shown to improve the catalytic activity of the resulting supported iMeH catalyst system.

While not being bound by any particular theory, it is believed that the iMeH components of the catalysts can absorb molecular hydrogen and then release monatomic hydrogen, which is more reactive with the hydrocarbons in the process than the diatomic hydrogen that is typically present. However, it is believed that when the monatomic hydrogen is released from the iMeH surface it requires a physical pathway to get from the hydrogen activation site to the catalytic sites where it can be utilized. Therefore, in the present invention, synthesizing a metal oxide around and connected to the iMeH rather than simply physically blending powders of the iMeH and metal oxide support may allow more extensive integration and connectivity between the iMeH and the metal oxide support. This may provide an efficient pathway for monatomic hydrogen transfer from the iMeH to the surface of the metal oxide, where it may react with the hydrocarbon molecules or heteroatom-containing molecules (such as sulfur, nitrogen, or metals) in the feedstream, resulting in the unexpected catalytic activities shown in the examples herein. The monatomic hydrogen may also react with additional catalytic elements that may be optionally present on the surface of the metal oxide, subsequently reacting with hydrocarbon molecules or heteroatom-containing molecules in the feedstream. The resulting products (e.g., hydrogen sulfide) can then be easily removed from the hydroprocessed product stream.

Integrating the iMeH within a metal oxide support may also serve to partially protect the iMeH from heteroatom-containing molecules in the hydrocarbon feedstream, as the metal oxide support will provide a porous coating on the surface of the iMeH, and it is believed that while the smaller hydrogen molecules can diffuse through the metal oxide coating or film, that large heteroatom molecules, which can poison and catalytically deactivate the iMeH, are significantly hindered from penetrating deeply into integrated catalyst and thus reducing overall contact with the iMeH. Sulfur- and nitrogen-containing compounds (i.e., heteroatoms) may bind to the metals in an iMeH, deactivating the catalytic sites. The metal oxide may shield the iMeH from these heteroatom-containing molecules while still allowing hydrogen absorption and monatomic hydrogen desorption, increasing the monatomic hydrogen utilization of the iMeH.

In some embodiments of the catalyst of the present invention, the support is synthesized around the iMeH by condensation of a metal alkoxide. For example, the metal oxide support with embedded iMeHs can be synthesized by preparing a slurry of an iMeH with a metal alkoxide (e.g., titanium (IV) tert-butoxide or zirconium (IV) tert-butoxide) in an alcohol solvent such as tert-butanol. An acid such as phosphoric acid may be added to catalyze the condensation reaction to form a metal oxide-containing gel (e.g., titania or zirconia), which may be dried under an inert atmosphere to yield a porous metal oxide support with an iMeH integrally embedded within it.

In some embodiments, the metal of the metal alkoxide is selected from silicon, aluminum, titanium, zirconium and combinations thereof. In some embodiments, the alkoxide is selected from ethoxide, isopropoxide, n-butoxide, tert-butoxide and combinations thereof. In exemplary embodiments, the metal alkoxide is selected from titanium(IV) tert-butoxide, zirconium(IV) tert-butoxide, tetrabutyl orthosilicate and aluminum isopropoxide, and combinations thereof. The resulting metal oxide is selected from silica, alumina, titania and zirconia, and combinations thereof.

The composite material comprising a porous metal oxide with an iMeH integrally embedded within the porous metal oxide, may result in a catalyst with significant surface area. For example, the iMeH component may be formed as a powder with minimal surface area, e.g., <1 m²/g After the integrally embedded material is synthesized, the resulting catalyst may have a surface area of much greater than 1 m²/g, for example, at least 10 m²/g, at least 25 m²/g, at least 50 m²/g.

The metal oxide herein is preferably a porous metal oxide. The pores of the porous metal oxide may be greater than 0.01 cc/g, or more preferably greater than 0.1 cc/g.

Although the metal oxide when utilized as a coating or film for the iMeH as described herein may vary depending on the actual compositions and desired properties, in preferred embodiments herein, the metal oxide is at least 10 wt % based on the total weight of the final integrated metal oxide/iMeH catalyst or catalyst component. In more preferred embodiments, the metal oxide is at least 25 wt %, or even at least 50 wt %, based on the total weight of the final integrated metal oxide/iMeH catalyst or catalyst component.

After the integrated metal oxide/iMeHs catalyst herein have been made, the monatomic hydrogen uptake by the catalyst of the invention can be determined. For example, the hydrogen/metal ratios (H/M values) for certain catalysts of the invention are shown in Table 1. These illustrate that the iMeH component of the catalyst may remain accessible to hydrogen when coated with the metal oxide. As such, it is believed that the applied coating of the present invention may provide a porous medium through which the hydrogen (or monatomic hydrogen) atoms can move in and out of the iMeH component.

Dopants

In other preferred embodiments herein, The integrated metal oxide/iMeH catalysts/catalyst components can also include a transition metal dopant. In preferred embodiments, the transition metal dopant is a mixed valence metal. Preferably, mixed valence metal dopant is selected from cerium, vanadium, tin, antimony and combinations thereof.

While not being bound by any particular theory, it is believed that the incorporation of a mixed valence metal in to the metal oxide support system may allow for increased charge transfer. This may further promote monatomic hydrogen spillover from the iMeH to the surface of the catalyst, allowing the monatomic hydrogen to react with the hydrocarbon molecules or heteroatom-containing molecules (such as sulfur, nitrogen, or metals) in the feedstream. The monatomic hydrogen may also react with additional catalytic elements that may be optionally present on the surface of the metal oxide, or mixed with the metal oxide, subsequently reacting with hydrocarbon molecules or heteroatom-containing molecules in the feedstream. The examples herein further illustrate this mixed valence metal concepts and embodiments disclosed herein.

Catalyst Activities

The activities of catalysts of the invention may be assayed using model feeds, for example, a poly-alpha-olefin based model feed. The model feed may be spiked with certain molecules in order to assay certain activities, such as hydrogenation activity and hydrodesulfurization (HDS) activity. Non-limiting examples of such model compounds include HDS substrates dibenzothiophene (DBT) and 4,6-diethyldibenzothiophene (DEDBT), and hydrogenation substrates 1n-dodecylnaphthalene ($C_{12}$ naphthalene). The activities of the catalysts may be determined by measuring the first order rate constants for the conversion (or disappearance) of these compounds from the model feeds.

While not being bound by any particular theory, embedding the iMeH in the support may partially protect the iMeH from potential catalyst poisons, such as sulfur- and nitrogen-containing compounds in the hydrocarbon feedstream. It may also shorten the spillover pathway between the iMeH and optional additional catalytic materials present on or in the support. This may improve the efficiency of monatomic hydrogen utilization in the catalytic reaction.

Catalyst Formulations

The integrated metal oxide/iMeH composite catalysts described herein may be used alone, or they can be combined with other components such as additional catalyst materials. For example, the catalysts can be combined with known hydroprocessing catalysts such as noble metals, metal oxides, metal sulfides, zeolitic acid or base sites to further promote hydroprocessing of feedstocks such as organic compounds. The catalysts of the invention can be combined with other hydroprocessing materials in a variety of ways to build an optimized catalyst for a particular reaction or function.

The catalysts can optionally be combined with other catalytic elements to produce a composite catalyst. Other catalytic elements included in the catalyst systems of the present invention may be noble metals such as platinum or palladium, Group VI and VIII metals, Group VI and VIII metal oxides and/or metal sulfides, zeolite acid or base sites. A hydroprocessing component and a hydrocracking component used in combination with the catalyst may be one or more of these catalytic elements.

The additional catalytic elements can be incorporated into the catalysts in several ways. In a most preferred embodiment, the additional catalytic elements may be added to the surface of (i.e., dispersed onto) the composite metal oxide/embedded iMeHs herein.

The catalyst may further include a radio frequency or microwave absorber, which may be in thermal contact with the interstitial metal hydride. The separate radio frequency or microwave absorber absorbs the energy and transfers it to the iMeH through thermal conduction or convection. These absorbers may be added metal elements or metal compounds with high dielectric constants, and may be, for example, one or more compounds such as silicon carbide, iron silicide, nickel oxide, and tungsten carbide. In another embodiment of the invention, the iMeH component functions as the primary absorber of RF or microwave energy. When used with microwave enhancement, the iMeH component is sufficiently dispersed within the catalyst and feedstock combination to avoid hot spots and arcing generally associated with the introduction of metals into a microwave or RF field.

Hydroprocessing & Reforming Processes

The catalysts of the invention may be used in hydroprocessing and/or reforming processes. In an exemplary embodiment of the present invention, a hydrocarbon stream and/or a heavy hydrocarbon stream is contacted with a catalyst of the invention in the presence of hydrogen. In some embodiments, the hydrocarbon stream and/or heavy hydrocarbon stream contains at least 1 wt % sulfur and more suitably at least 3 wt % sulfur. In other exemplary embodiments of the present invention, the hydrocarbon stream and/or the heavy hydrocarbon stream that is desulfurized in the present process contains polycyclic sulfur heteroatom complexes which are difficult to desulfurize by conventional methods.

The catalysts and catalyst components embodied herein can be particularly beneficial when used in processes where such catalyst is in contact with a hydrocarbon feedstream which contains at least 10 ppm nitrogen. The catalysts herein are also particularly beneficial when the hydrocarbon feedstream contains at least 50 ppm nitrogen, and more preferably at least 100 ppm nitrogen. Such nitrogen content may be comprised of molecular nitrogen as well as nitrogen compounds. Of particular concern are the organo-nitrogen compounds in the feedstream.

Although not required for the use of the present invention, the catalytic activity of the catalysts of the present invention can be enhanced and controlled by exposing the catalysts to radio frequency ("RF") energy (about $3 \times 10^5$ Hz to about $3 \times 10^8$ Hz) or microwave energy (about $3 \times 10^8$ Hz to about $3 \times 10^{12}$ Hz), either in the absence of, the presence of, or in sequence with conventional fuel fired heating or resistive heating. The RF or microwave energy can provide for a significant increase in hydroprocessing efficiency in comparison to conventional heating. Furthermore, the microwave energy can be modulated and controlled in such a manner as to optimize the reaction exchange of the monatomic hydrogen from the iMeH. When used with microwave enhancement, the iMeH component is sufficiently dispersed within the catalyst and feedstock combination to avoid hot spots and arcing generally associated with the introduction of metals into a microwave or RF field.

The selective use of RF or microwave energy aids in the release of the iMeH monatomic hydrogen. It is cost effective to maximize the use of fossil fuels to pre-heat the feedstocks to near reaction temperatures, and use minimum RF or microwave energy to drive and control the hydroprocessing reactions. Ideally, there will be a minimized or zero net temperature increase from the RF or microwave energy into the catalyst support, if present, or into the feedstock because this energy is primarily targeted into the iMeH to enhance the reaction exchange of monatomic hydrogen. Selective coupling of the RF or microwave energy is accomplished through selection and control of the relative dielectric parameters of the catalyst's components and the feedstock. This results in efficient, economically viable catalytic processes, which are enhanced using microwaves.

Figure 6:
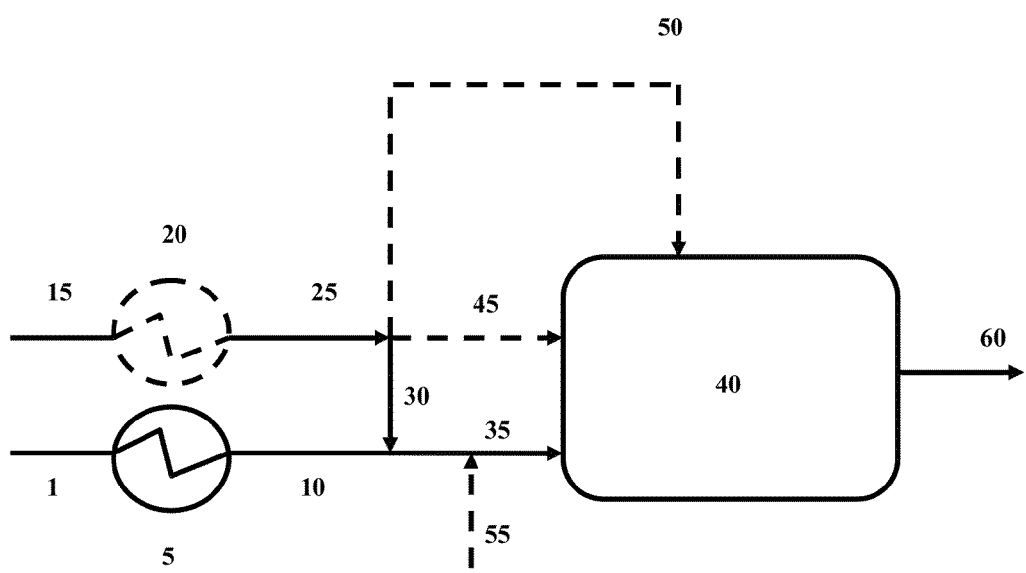
FIG. 6 is a simplified schematic of an exemplary reaction process configuration using the catalysts of the present invention.

A schematic of an exemplary hydroprocessing configuration using the catalysts of the present invention is shown in FIG. 6 wherein the incoming hydrocarbon feedstream is heated to a target temperature prior to entering the reactor and the RF or microwave energy is introduced into the reactor itself. FIG. 6 shows an exemplary embodiment of the present invention wherein a single stage reactor unit is used. Here, a hydrocarbon stream (1) is heated to a predetermined elevated temperature utilizing a fired heater or heat exchange unit (5) to produce a heated hydrocarbon feedstream (10). Similarly a hydrogen-rich stream (15) can be heated, if necessary, a fired heater or heat exchange unit (20) to produce a heated hydrogen-rich stream (25). The term "hydrogen-rich stream" as used herein is a stream containing at least 50 mole percent (mol %) of hydrogen. In an exemplary embodiment, at least a portion of the heated hydrogen-rich stream (25) is combined via (30) with the heated hydrocarbon feedstream (10) to form a heated combined hydrocarbon feedstream (35) which is fed to the hydroprocessing reactor unit (40). In an optional embodiment, some, or all, of the heated hydrogen-rich stream enters directly into the hydroprocessing reactor unit (40) via line (45). Even more suitably, at least some of the heated hydrogen-rich stream (25) is fed to various points (50) within the hydroprocessing reactor unit (40) itself. This added hydrogen in the reaction process assists in maintaining a sufficient hydrogen concentration within the reactor itself as well as providing fresh hydrogen for absorption/desorption by catalysts.

Continuing with FIG. 6, in an exemplary embodiment, the catalyst is substantially maintained in the hydroprocessing reactor unit (40) itself. However, in other embodiments, a portion or all of the catalyst is introduced into the feedstream entering the reactor (55) as a slurry or particulate catalyst. Although the catalyst is shown entering the feedstream system at point (55), the catalyst can be entered in to the hydrocarbon feedstream, the heated hydrocarbon feedstream, and/or the hydrogen-rich stream at any point prior to entering the hydroprocessing reactor unit (40). In an exemplary embodiment, RF or microwave energy is supplied to the catalyst/hydrocarbon/hydrogen mixture in the hydroprocessing reactor (40) to assist in promoting the absorption and desorption of the monatomic hydrogen in the catalysts. Continuous, pulsed, frequency modulated and/or two or more frequencies of RF or microwave energy may be used.

A reaction product stream (60) is withdrawn from the hydroprocessing reactor (40). This stream will typically contain some gaseous hydrocarbon products and hydrogen along with a liquid hydrocarbon product stream. These gaseous products can be separated by processes known in the art and a liquid hydrocarbon product stream with improved product qualities is retrieved.

In some embodiments, the operating (or "reaction") conditions are at least 200 psig and at least 200° C. More suitable reaction conditions are at least 600 psig and at least 250° C. Suitable hydrogen partial pressures are at least about 200 psia, and even more suitably at least about 500 psia. Most suitably, the reaction conditions are within the operating envelope of about 200° C. to about 450° C. with an operating pressure of from about 200 psig to about 2500 psig.

Hydroprocessing configurations using the catalysts of the present invention, which incorporate additional process stages and hydroprocessing reactors to those described above may be also be used in the processes of the present invention and may also be coupled with interstage and/or inter-reactor separations steps to separate liquid hydrocarbon-containing reaction streams from gaseous hydrocarbon-containing reaction streams and/or to incorporate separation steps for separating the catalysts from the hydrocarbons in order to improve overall selectivity and conversion of the final hydrocarbon products as would be within the purview of one of skill in the art in light of the present invention disclosure.

The catalysts of the present invention can be used in any hydroprocessing or reforming processes. Specific hydroprocessing processes in which the catalysts of the present invention can be used include, but are not limited to the following processes: hydrogenation, hydrocracking, hydrodesulfurization, hydrodenitrogenation, hydrodemetalization and catalytic hydrodewaxing. Specific reforming processes in which the catalysts of the present invention can be used include, but are not limited to the following processes: catalytic reforming and catalytic isomerization.

Although the present invention has been described in terms of specific embodiments, it is not so limited. Suitable alterations and modifications for operation under specific conditions will be apparent to those skilled in the art. It is therefore intended that the following claims be interpreted as covering all such alterations and modifications as fall within the true spirit and scope of the invention.

EXAMPLES

Example 1

This example describes how the CAT 400 iMeH components used in the Examples herein, including those used in the catalysts of the invention, were fabricated. While the coated iMeH compositions of present invention are believed to operate with any interstitial metal hydride (iMeH), the CAT 400 composition samples were used throughout in the testing of these Examples to provide proof of concept on a comparative standard basis.

IMeH Sample Preparations

The metal alloys were prepared by melting together the appropriate amounts of metals with purities of 99.9% (from Alfa Aesar/Johnson Matthey Company™) in an argon atmosphere using water cooled copper hearth argon arc furnace Model CENTORR® from Centorr Vacuum Industries™, Nashua, N.H. Each arc-melted ingot was flipped over and re-melted three times and was normally held in the liquid state for approximately 30 seconds to insure complete mixing of the starting materials.

To obtain single phase materials, the cast samples were sealed in quartz tubes, filled with ⅓ atmosphere of argon gas and annealed at 950° C. for a period of 3 to 5 days using a Thermo scientific Lindberg/Blue™ tube furnace. The samples in the tubes were water quenched to avoid a possible phase transition during the cooling process.

The crystal structures of the samples were determined by X-ray diffraction.

CAT 400 is based on a compositional structure of $ZrV_2$. The reduction in the sample weight was negligible. The crystal structure was determined to be single phase with cubic Laves phase C15 ($MgCu_2$) type for $ZrV_2$ alloys.

The metal alloy bulk was crushed manually to an average particle size of approximately 200 μm (microns). The hard alloy samples were milled mechanically at cryogenic temperatures (approximately 80° K) and then were attrited. All samples were sieved to under approximately 200 μm (microns).

All particle size preparations of the samples were performed under inert nitrogen atmosphere conditions. The average particle size distribution was obtained using Horiba Laser-La-920® Particle Analyzer, from HORIBA Instruments™, Inc., Irvine, Calif.

iMeH Catalyst Activation

Approximately 40 to 50 grams of metal alloy powder with known molecular weight was then placed into the stainless steel reactor connected to the Hy-Energy™ system. The reactor was then purged with hydrogen three times. $H_2$ pressure is introduced to the sample chamber from about 500 psig to about 800 psig at ambient temperature (i.e., 25° C.) and a waiting period is given to observe if any absorption takes place. A pressure drop in the reactor, generally in the range of about 20 psig depending on the amount of hydrogen absorbed, will indicate the hydrogen activation process. Typical waiting period times are from 10 to 30 minutes. If no absorption occurs, then the temperature is raised to about 250° C. The temperature needed to activate the sample depends on the active surface of the alloy. The sample starts absorbing hydrogen which is an exothermic process. The hydrogen activated sample is then cooled down to ambient temperature and pressure to achieve maximum hydrogen absorption.

Example 2

This example describes how the metal oxides were integrally synthesized with the CAT 400 iMeH to form exemplary catalysts of the invention. In this example, the CAT 400 formulation was $ZrV_2$ as described in Example 1.

Preparation of Metal Oxide/$ZrV_2$ Catalysts $ZrV_2$ was slurried in tent-butanol in the presence of a metal alkoxide (e.g. titanium(IV) tert-butoxide, zirconium(IV) tert-butoxide, tetrabutyl orthosilicate, or aluminum isopropoxide), and a dopant (cerium(III) nitrate or vanadium(III) acetylacetonate). A catalyst (in this case, phosphoric acid) was added to initiate a condensation reaction, resulting in formation of a gel. The gel was dried in a nitrogen vacuum oven at approximately 80° C. The resulting product was calcined under argon at 350° C. for at least 3 hours, and then recharged under hydrogen at 400° C. and 500 psig.

The resulting catalysts were analyzed to determine the pore volume, the total surface area, the hydrogen/metal (H/M) ratio (used to determine hydride accessibility to hydrogen), the weight percentages of $ZrV_2$ and metal oxide, and phosphorus levels. The results are presented in Table 1.

TABLE 1

Physical properties of certain catalyst preparations.

| | iMeH/Metal oxide/dopant | | | | | | |
|---|---|---|---|---|---|---|---|
| | Cat400/ $TiO_2$/Ce | Cat400/ $TiO_2$/V | Cat400/ $SiO_2$/Ce | Cat400/ $ZrO_2$/Ce | Cat400/ $ZrO_2$/V | Cat400/ $Al_2O_3$/Ce | Cat400 alone |
| Pore Volume | 0.13 | 0.047 | 0.15 | 0.16 | 0.20 | 0.69 | 0 |
| Total Surface Area | 92.4 | 22.1 | 57.0 | 48.6 | 80.6 | 179.9 | <1 |
| H/M | 0.12 | 0.10 | 0.002 | NA | 0.11 | NA | Up to 0.7 |
| Cat 400 wt % | 56% | 44% | 29% | 44% | NC | 43% | 100% |
| Metal oxide wt % | 32% | 33% | 12% | 43% | NC | 37.6 | 0% |
| Phosphorous | ND | ND | 9.73 | ND | ND | ND | ND |

ND = none detected. NA = not available. NC = Could not be calculated

As can be seen from the data in Table 1, in all of the catalysts of invention prepared by the methods herein, hydrogen was still able to access the embedded iMeHs.

The novel compositional interface of the catalysts herein can be seen in FIG. 1 herein. FIG. 1 is an X-Ray Diffraction ("XRD") pattern of an embodiment of an "integrally synthesized" iMeH/$TiO_2$/Ce catalyst of the present invention as prepared per this example. In FIG. 1, the iMeH component ($ZrV_2H_{3.6}$, Vanadium Zirconium Hydride) as well as an interfacial compound ($CeTi_{0.5}V_{0.5}O_3$, Cerium Titanium Vanadium Oxide) containing elements from each the $TiO_2$ metal oxide support and the CAT 400 (zirconium vanadium) iMeH formed between the metal oxide support and the iMeH. The interfacial compound of the integrated metal oxide/iMeH in this example also contains the dopant element cerium.

Figure 2:
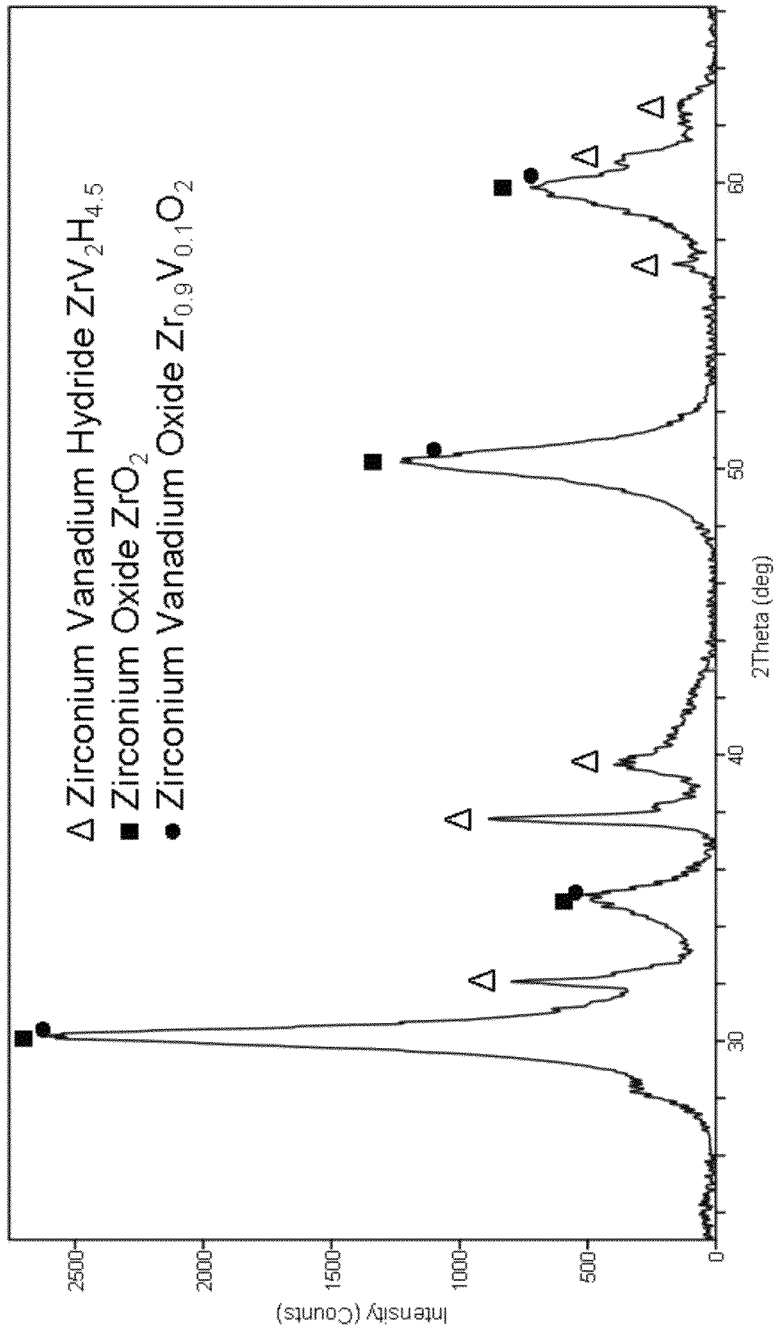
FIG. 2 is an X-Ray Diffraction ("XRD") pattern of an embodiment of an "integrally synthesized" iMeH/ZrO$_2$/Ce catalyst of the present invention.

FIG. 2 is an X-Ray Diffraction ("XRD") pattern of an embodiment of an "integrally synthesized" iMeH/$ZrO_2$/Ce catalyst of the present invention as prepared per this example. In FIG. 2, the iMeH component ($ZrV_2H_{4.5}$, Vanadium Zirconium Hydride) as well as an interfacial compound ($Zr_{0.9}V_{0.1}O_2$, Zirconium Vanadium Oxide) containing elements from each the $ZrO_2$ metal oxide support and the CAT 400 (zirconium vanadium) iMeH formed between the metal oxide support and the iMeH. Although it is believed that some compounds also exist with the dopant mixed valence metal (Cerium in this example) such compounds may not be able to be identified in the XRD pattern due to masking by similar compounds in the XRD or because the Ce compounds are in the amorphous phase and hence do not show up in the crystalline diffraction patterns.

Figure 3:
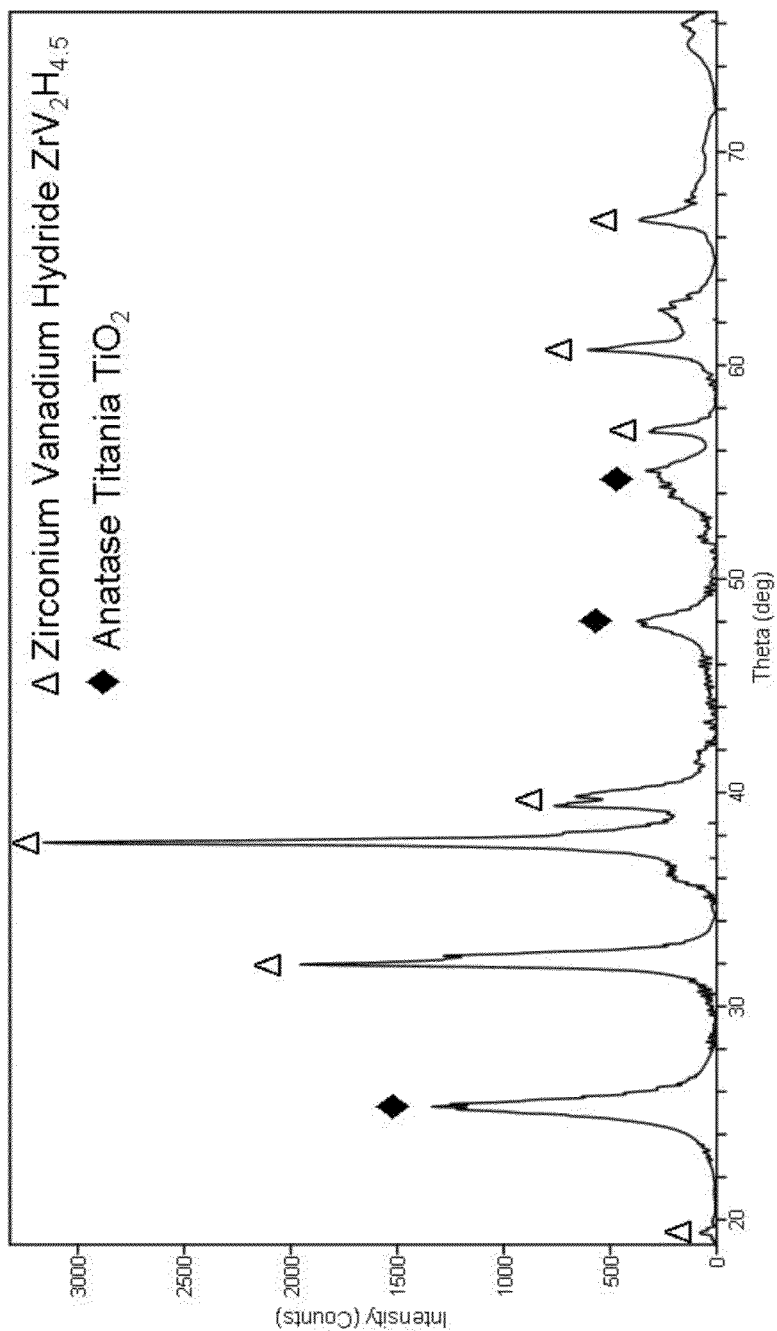
FIG. 3 is an X-Ray Diffraction ("XRD") pattern of an embodiment of a "pressed" iMeH/TiO$_2$ catalyst of the prior art.

For a comparison of the integrated mixed oxide/iMeH embodiments of the present invention shown in FIGS. 1 and 2, a mixed metal oxide and iMeH catalyst was prepared per the methods of the prior art and the XRD pattern is shown in FIG. 3. Here, the $TiO_2$ (anatase titania) was slurried, dried, then pressed together with the CAT 400 iMeH per methods of the prior art. As can be seen in the resulting XRD pattern in FIG. 3, the resulting catalyst only shows the separate iMeH (CAT 400, zirconium vanadium) and metal oxide ($TiO_2$, anatase titania) components. No intermediate, interfacial compounds as formed by the catalysts of the present invention as are indicated in FIGS. 1 and 2.

Example 3

The procedures of this example were used to measure the activities of the catalysts of the invention in the presence of model feeds.

HiP/HOSS, standing for High Pressure Reactors and Heated Orbital Shaker System, is a batch reactor unit used for catalyst activity evaluation. The catalyst samples were pretreated in nitrogen at 150° C. for 1 hr. The catalysts were then sulfided at two stages, i.e., 250° C. for 2 hrs, and 360° C. for another 2 hrs. 10% $H_2S$ balanced with $H_2$ was used for catalyst sulfiding. After sulfiding, the catalysts were cooled down to 25° C. under 10% $H_2S$ balanced with $H_2$ flow and were then purged with nitrogen for another 1.5 hrs before additions of the model feeds. Feeds with three model compounds were used for catalyst activity evaluations. These three model feeds are poly alpha olefins based (PAO, 6 cSt) and spiked with 0.3% dibenzothiophene (DBT), 0.3% 4,6-diethyldibenzothiophene (DEDBT), and 1% 1n-dodecyl ($C_{12}$) naphthalene, respectively. The 25 to 150 mg of catalysts were loaded into HiP/HOSS, which is 0.5 to 2 VHSV equivalent. The catalytic evaluation tests were carried out at 280° C. with hydrogen partial pressure of 200 psig.

Figure 4B:
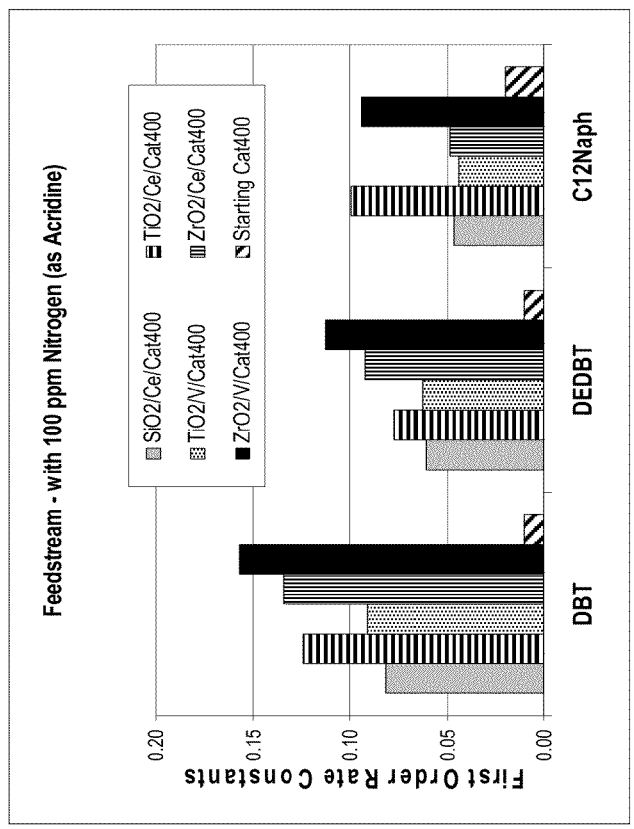
FIG. 4B is a graph depicting first order rate constants for the conversion of dibenzothiophene (DBT), 4,6-diethyldibenzothiophene (DEDBT) and 1n-dodecylnaphthalene (C$_{12}$ naph) in model feeds containing acridine, in the presence of catalysts of the invention.
Figure 4A:
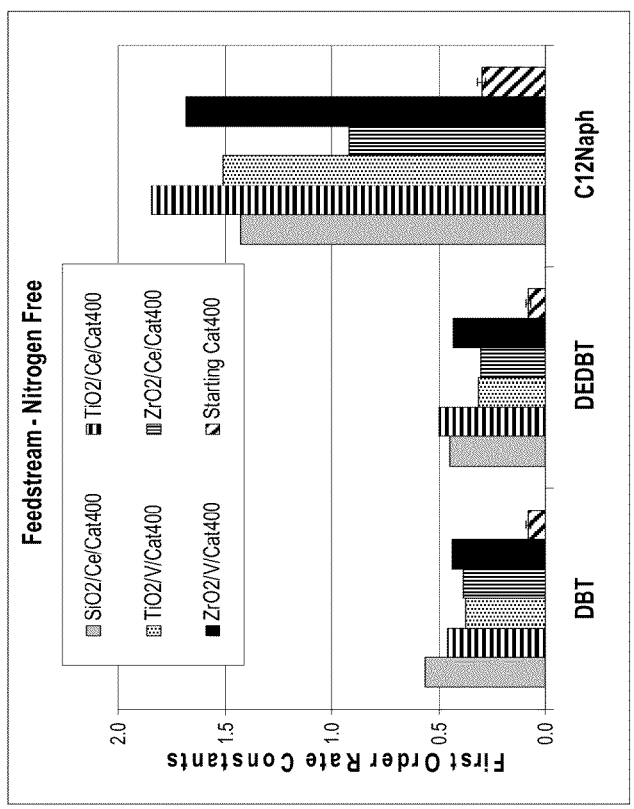
FIG. 4A is a graph depicting first order rate constants for the conversion of dibenzothiophene (DBT), 4,6-diethyldibenzothiophene (DEDBT) and 1n-dodecylnaphthalene (C$_{12}$ naph) in model feeds, in the presence of catalysts of the invention.

Results for the model feeds are illustrated in FIG. 4A, which shows the first order rate constants for disappearance of DBT, DEDBT and $C_{12}$ naphthalenes for the catalyst samples. The results are also illustrated in Table 2. The metal oxide-coated iMeHs have 3-7× higher activities than the iMeH alone on a total volume basis. (The advantage is much greater on a weight basis) This advantage is observed even though the absolute amount of iMeH is significantly lower in the formulated iMeH/metal oxide system.

TABLE 2

First order rate constants for the disappearance
of compounds from model feeds.

| | DBT | +/− | DEDBT | +/− | C12 Naph | +/− |
|---|---|---|---|---|---|---|
| Cat400/SiO$_2$/Ce | 0.56 | 0.05 | 0.45 | 0.06 | 1.43 | 0.16 |
| Cat400/TiO$_2$/Ce | 0.46 | 0.04 | 0.50 | 0.06 | 1.85 | 0.16 |
| Cat400/TiO$_2$/V | 0.37 | 0.04 | 0.31 | 0.04 | 1.51 | 0.14 |
| Cat400/ZrO$_2$/Ce | 0.39 | 0.07 | 0.31 | 0.04 | 0.92 | 0.24 |
| Cat400/ZrO$_2$/V | 0.44 | 0.06 | 0.43 | 0.08 | 1.68 | 0.26 |
| Cat400 alone | 0.08 | 0.01 | 0.08 | 0.01 | 0.30 | 0.02 |

Results for model feeds additionally containing 70 ppm of a nitrogen-containing aromatic compound, acridine, are shown in FIG. 4B and Table 3. The metal oxide-coated iMeHs retain higher absolute activities and have 2-16× higher activities in the presence of acridine than the iMeH alone on a total volume basis.

TABLE 3

First order rate constants for the disappearance of compounds
from model feeds additionally containing 70 ppm acridine.

| | DBT | +/− | DEDBT | +/− | C12 Naph | +/− |
|---|---|---|---|---|---|---|
| Cat400/SiO$_2$/Ce | 0.08 | 0.01 | 0.06 | 0.01 | 0.05 | 0.00 |
| Cat400/TiO$_2$/Ce | 0.12 | 0.01 | 0.08 | 0.01 | 0.10 | 0.02 |
| Cat400/TiO$_2$/V | 0.09 | 0.03 | 0.06 | 0.02 | 0.04 | 0.01 |
| Cat400/ZrO$_2$/Ce | 0.13 | 0.01 | 0.09 | 0.01 | 0.05 | 0.01 |
| Cat400/ZrO$_2$/V | 0.16 | 0.01 | 0.11 | 0.01 | 0.09 | 0.01 |
| Cat400 alone | 0.01 | 0.01 | 0.01 | 0.01 | 0.02 | 0.01 |

As can be seen in the data in Tables 2 and 3 above, as well as graphically shown in FIGS. 4A and 4B, respectfully, the integrated metal oxide/iMeH catalysts of the present invention show a marked improvement over the CAT 400 alone.

Additionally, the first order rate constants for the two (2) TiO$_2$ based catalysts of invention embodiments above are shown in Tables 4 and 5 compared to a TiO$_2$/CAT 400 catalyst as prepared to prior art methods wherein the metal oxide was coated onto the CAT 400 (i.e., two distinct phases). Table 4 shows the first order rate constants base on the same model feeds as utilized in Table 2 above, and Table 5 shows the first order rate constants base on the same model feeds additionally containing 70 ppm of a nitrogen-containing aromatic compound, acridine, as utilized in Table 3 above.

TABLE 4

First order rate constants for the disappearance
of compounds from model feeds.

| | DBT | DEDBT | C12 Naph |
|---|---|---|---|
| Cat400/TiO$_2$/Ce | 0.46 | 0.50 | 1.85 |
| Cat400/TiO$_2$/V | 0.37 | 0.31 | 1.51 |
| TiO2 coated Cat400 (prior art) | 0.31 | 0.21 | 0.77 |

TABLE 5

First order rate constants for the disappearance of compounds
from model feeds additionally containing 70 ppm acridine.

| | DBT | DEDBT | C12 Naph |
|---|---|---|---|
| Cat400/TiO$_2$/Ce | 0.12 | 0.08 | 0.10 |
| Cat400/TiO$_2$/V | 0.09 | 0.06 | 0.04 |
| TiO2 coated Cat400 (prior art) | 0.04 | 0.01 | 0.03 |

Figure 5B:
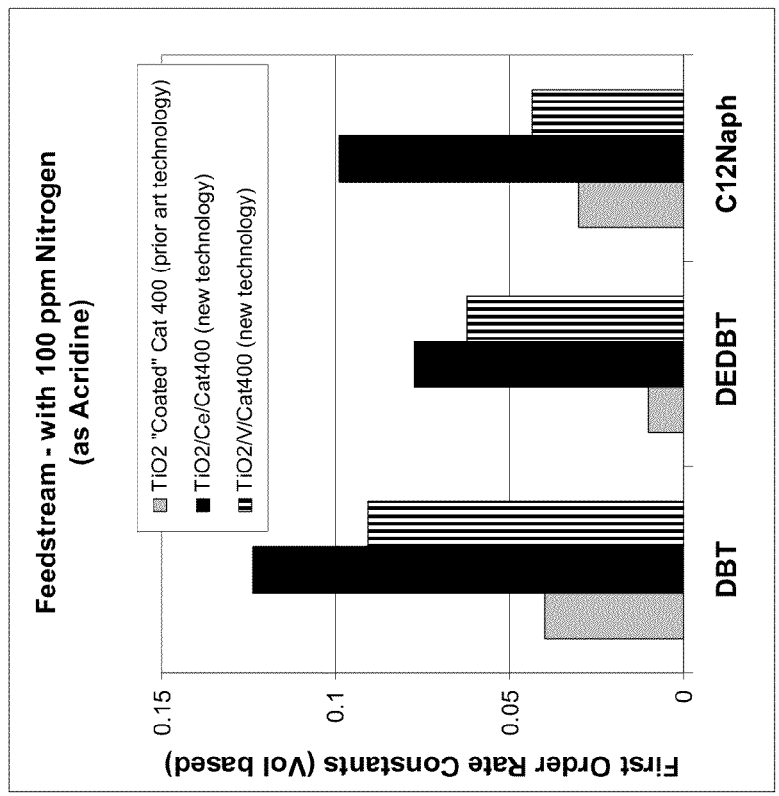
FIG. 5B is a graph depicting first order rate constants for the conversion of dibenzothiophene (DBT), 4,6-diethyldibenzothiophene (DEDBT) and 1n-dodecylnaphthalene (C$_{12}$ naph) in model feeds containing acridine, in the presence of catalysts of the invention as compared to catalysts prepared per methods of the prior art.
Figure 5A:
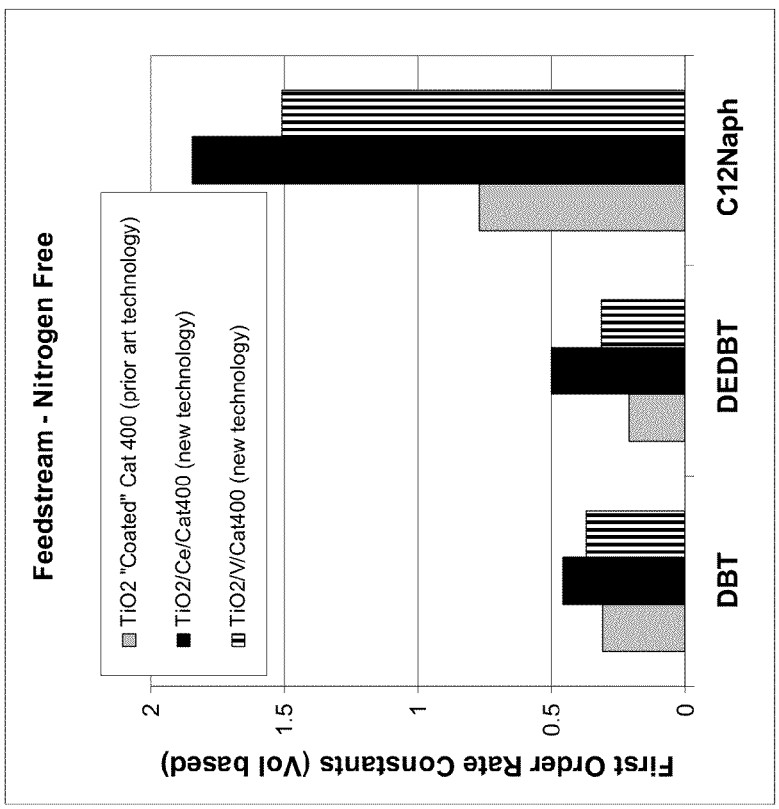
FIG. 5A is a graph depicting first order rate constants for the conversion of dibenzothiophene (DBT), 4,6-diethyldibenzothiophene (DEDBT) and 1n-dodecylnaphthalene (C$_{12}$ naph) in model feeds, in the presence of catalysts of the invention as compared to catalysts prepared per methods of the prior art.

The first order rate constants as calculated from the test results as shown in Tables 4 and 5 are also shown graphically in FIGS. 5A and 5B, respectfully herein.

As can be seen from the data in Tables 4 and 5 and respective FIGS. 5A and 5B, the integrated metal oxide/iMeH catalyst embodiments of the present invention have higher activity (as measured by the first order rate constants) as compared with comparable compositional catalysts prepared by the methods of the prior art.

All patents, publications and references cited herein are hereby fully incorporated by reference. In case of conflict between the present disclosure and incorporated patents, publications and references, the present disclosure should control.

What is claimed is:

1. A catalyst comprising:
    a metal oxide layer, the metal oxide being doped with a mixed valence metal selected from vanadium, cerium, tin, antimony, and combinations thereof; and
    an interstitial metal hydride;
    wherein an interfacial compound containing at least one element from each the metal oxide layer and the iMeH is formed between the metal oxide layer and the iMeH.

2. The catalyst of claim 1, wherein the metal oxide layer forms a coating around the interstitial metal hydride.

3. The catalyst of claim 1, wherein the interstitial metal hydride has a compositional formula of $A_{1-x}M_xT_{5-y-z}B_yC_z$, wherein:
    A=Mm (mischmetal); T=Ni; M=La, Pr, Nd or Ce; B=Co; C=Mn, Al or Cr; and
    x=0.0 to 1.0; y=0.0 to 2.5; and z=0.0 to 0.5.

4. The catalyst of claim 1, wherein the interstitial metal hydride has a compositional formula of $A_{2-x}M_xT_{14-y}C_yD_zB$, wherein:
- A=Nd or Pr; T=Fe; M=La, Pr, Nd or Ce; B=Boron; C=Co; D=Cr, Ni or Mn; and
- x=0.0 to 2.0; y=0.0 to 14; and z=0.0 to 3.0.

5. The catalyst of claim 1, wherein the interstitial metal hydride has a compositional formula of $A_{2-x}M_xT_{1-y}B_y$, wherein:
- A=Mg; T=Ni or Cu; M=La; B=Fe or Co; and
- x=0.0 to 0.5; and y=0.0 to 0.5.

6. The catalyst of claim 1, wherein the interstitial metal hydride has a compositional formula of $A_{1-x}B_xT_{(2-y)+d1}C_{y+d2}$, wherein:
- A=Nd or Zr; B=at least one of La, Ce, Pr, Gd, Tb, Dy, Er, Ho, Ti and Hf; T=at least one of Fe and V; C=at least one of Cr, Mn, Fe, Co, Ni and Cu;
- x=0.0 to 1.0; and y=0.0 to 2.0; and
- $d_1$=0.00 to 0.2; and $d_2$=0.00 to 0.2.

7. The catalyst of claim 1, wherein the metal oxide is selected from the group consisting of alumina, silica, titania, zirconia, and combinations thereof.

8. The catalyst of claim 1, wherein the metal oxide is a porous metal oxide.

9. The catalyst of claim 8, wherein the porous metal oxide has a pore volume greater than 0.01 cc/g; and the catalyst has a surface area greater than 10 m²/g.

10. The catalyst of claim 1, wherein the catalyst further comprises at least one transition metal element selected from Mo, W, Cr, V, Mn, Sn, Fe, Co, Ni, Pd, Ru, Ir, Rh, Ag and Pt.

11. The catalyst of claim 1, wherein the metal oxide is at least 10 wt % based on the total weight of the integrated metal oxide layer and iMeH.

12. A method of making a catalyst, comprising:
- a) combining an iMeH, a metal alkoxide and an alcohol;
- b) adding an acid to initiate a condensation reaction to form a metal oxide-containing gel; and
- c) drying the gel to form an integrated metal oxide layer and iMeH having a surface,
- wherein an interfacial compound containing at least one element from each the metal oxide layer and the iMeH is formed between the metal oxide layer and the iMeH.

13. The method of claim 12, further comprising at least one of the following steps:
- d) calcining the catalyst under an inert atmosphere;
- e) charging the catalyst under hydrogen.

14. The method of claim 12, wherein the metal alkoxide is selected from the group consisting of an aluminum alkoxide, a silicon alkoxide, a titanium alkoxide, a zirconium alkoxide, and combinations thereof.

15. The method of claim 14, wherein the metal alkoxide is selected from the group consisting of titanium(IV) tert-butoxide, zirconium(IV) tert-butoxide, tetrabutyl orthosilicate and aluminum isopropoxide.

16. The method of claim 15, wherein the metal oxide-containing gel comprises alumina, silica, titania, zirconia, and combinations thereof.

17. The method of claim 12, wherein step a) further comprises combining a mixed valence metal dopant selected from vanadium, cerium, tin, antimony, and combinations thereof.

18. The method of claim 12, wherein step a) further comprises combining at least one transition metal element selected from Mo, W, Fe, Co, Ni, Pd, and Pt.

19. A process for upgrading a hydrocarbon feedstream, comprising contacting a hydrocarbon feedstream with a catalyst to yield an upgraded hydrocarbon product stream wherein the catalyst is comprised of:
- a metal oxide layer;
- an interstitial metal hydride; and
- an interfacial compound containing at least one element from each the metal oxide layer and the iMeH wherein the interfacial compound is formed between the metal layer support and the iMeH.

20. The process of claim 19, wherein the process is performed in the presence of a hydrogen-rich gas containing at least 50 mol % hydrogen.

21. The process of claim 19, wherein the hydrocarbon feedstream and catalyst are further subjected to radio frequency energy or microwave frequency energy.

22. The process of claim 19, wherein the hydrocarbon feedstream is a heavy hydrocarbon feedstream with an API gravity of less than 20 and a sulfur content of at least 1 wt % sulfur.

23. The process of claim 19, wherein the hydrocarbon feedstream comprises a biofuel.

24. The process of claim 19, wherein the process is a hydroprocessing process selected from hydrogenation, hydrocracking, hydrodesulfurization, hydrodenitrogenation, hydrodemetalization, and catalytic hydrodewaxing processes.

25. The process of claim 24, wherein the catalyst is further comprised of at least one transition metal element selected from Mo, W, Fe, Co, Ni, Pd, and Pt.

26. The process of claim 19, wherein the process is a reforming process selected from catalytic reforming and catalytic isomerization.

27. The process of claim 26, wherein the catalyst is further comprised of a noble metal selected from Pd and Pt.

28. The process of claim 19, wherein the hydrocarbon feedstream contains at least 10 ppm nitrogen.

* * * * *